United States Patent [19]
Economy et al.

[11] 3,897,542
[45] July 29, 1975

[54] α-MoC SUPERCONDUCTOR FIBERS
[75] Inventors: James Economy, Eggertsville; William D. Smith, Tonawanda, both of N.Y.
[73] Assignee: The Carborundum Company, Niagara Falls, N.Y.
[22] Filed: Dec. 17, 1973
[21] Appl. No.: 425,460

Related U.S. Application Data
[63] Continuation-in-part of Ser. No. 158,356, June 30, 1971, abandoned.

[52] U.S. Cl. ............................. 423/440; 117/118
[51] Int. Cl. ............................................ C01b 31/34
[58] Field of Search .......... 423/53, 440; 252/67.3 C, 252/504; 117/118, 228

[56] References Cited
UNITED STATES PATENTS
| | | | |
|---|---|---|---|
| 3,433,725 | 3/1969 | Hough et al. | 423/440 |
| 3,594,226 | 6/1971 | Thomas et al. | 117/28 |
| 3,785,994 | 1/1974 | Bowman et al. | 117/118 |

OTHER PUBLICATIONS
Morton, N., "Upper Critical Fields of Superconducting Molybdenum Carbide at 4.2K," In. Cryogenics, 8(1), pp. 30–31, (1968).

Pring, J. N. et al.; "The Preparation at High Temperatures of Some Refractory Metals from their Chlorides," J. Chem. Soc, 95 pp. 149–99 1504 (1909).

*Primary Examiner*—Oscar R. Vertiz
*Assistant Examiner*—Eugene T. Wheelock
*Attorney, Agent, or Firm*—David E. Dougherty; Raymond W. Green

[57] ABSTRACT

α-MoC, having a face-centered-cubic crystal structure, can be prepared in fiber form by subjecting a fiber having a surface comprising dimolybdenum monocarbide to an electric voltage sufficient to raise momentarily the temperature of the fiber surface to a temperature at which the α-MoC is the most stable thermodynamically. The fiber so produced can have a carbon core, or the fiber can be entirely converted to α-MoC. This fiber is useful, for example, as a superconductor material for such applications as windings on magnets. The precursor fiber having a surface comprising dimolybdenum monocarbide can be produced by reacting a carbon fiber with hydrogen and molybdenum pentachloride in a reaction furnace.

12 Claims, 7 Drawing Figures

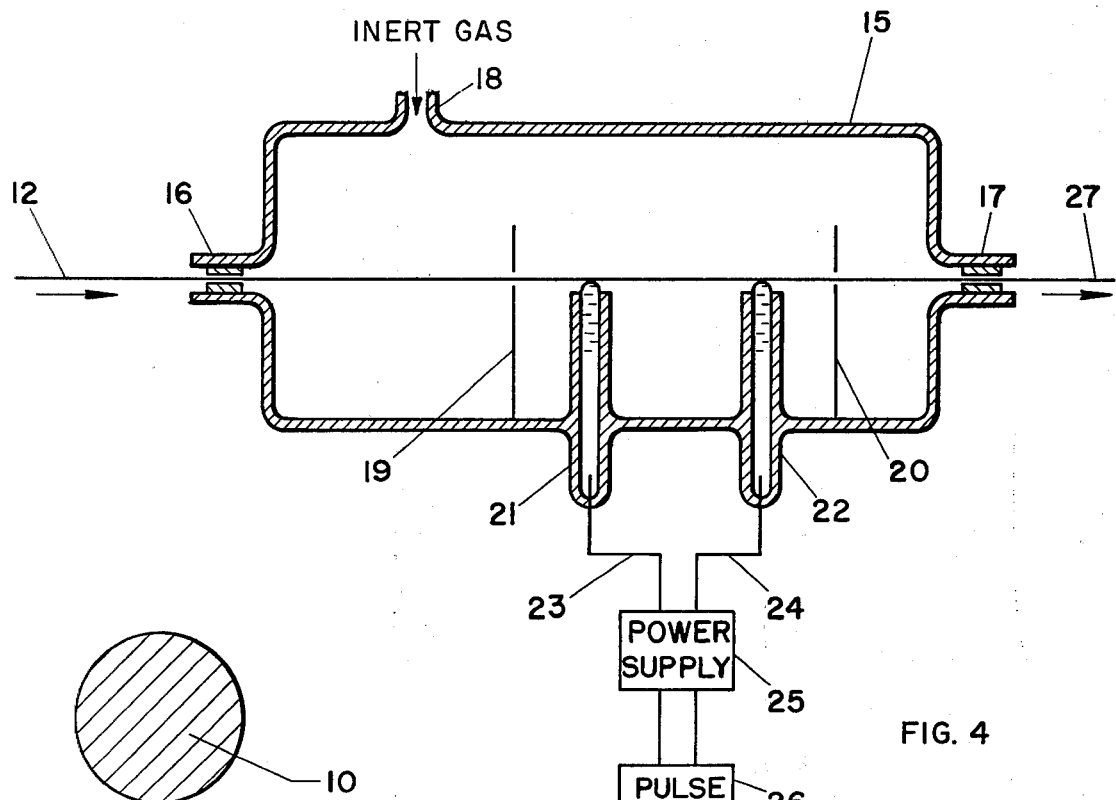
FIG. 4
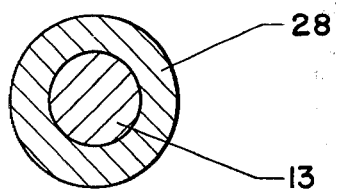
FIG. 1
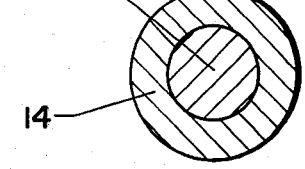
FIG. 3
FIG. 5
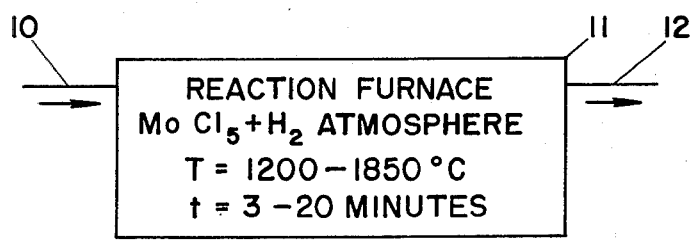
FIG. 2

ALPHA MOC SUPERCONDUCTOR FIBERS

CROSS-REFERENCE TO RELATED APPLICATION

This is a continuation-in-part of copending application Ser. No. 158,356, filed June 30, 1971, now abandoned.

BACKGROUND OF THE INVENTION

Molybdenum and carbon combine in a number of different crystal-line structures, including for example, dimolybdenum carbide, $Mo_2C$; eta molybdenum carbide $\eta$-MoC; and alpha molybdenum carbide, $\alpha$-MoC. Each of these molybdenum carbides is superconducting below a critical temperature, the critical temperatures for these three forms being about 4.0°K, 8.0°K and 12.1°K, respectively. It has been difficult to form superconducting materials having the last two crystal structures, however, since these crystal structures are most stable only at temperatures above about 1,650°C. This means that below that temperature, another form of molybdenum carbide, particularly dimolybdenum monocarbide, is more thermodynamically stable than the MoC forms. It is desirable to form the $\alpha$-MoC crystalline form, since its critical temperature of 12.1°K allows the utilization of this crystalline form at higher temperatures than other superconducting materials, such as dimolybdenum monocarbide and $\alpha$-MoC. $\alpha$-MoC also has a greater critical field than the other crystalline forms. The method usually employed in the past for forming $\alpha$-MoC has been to mix molybdenum and carbon powders to a temperature above the melting point of molybdenum carbide, i.e., about 2,600°C; and to eject the melted molybdenum carbide into or onto a cooling medium, such as oil, molten tin or copper plates. This produces small globules of $\alpha$-MoC contaminated by the cooling material.

Superconductors in fiber form are desirable for a variety of purposes, such as forming windings for magnets, to generate a high magnetic field for such end uses as particle accelerators and motors. Superconductor yarns are also useful in infrared detectors and in sensitive voltmeters, as well as for alternating current power transmission. Prior to the present invention, however, it has not been possible to provide a superconductor in fiber form having an $\alpha$-MoC surface, with either an $\alpha$-MoC or carbon core. Accordingly, it is an object of this invention to provide such a fiber.

SUMMARY OF THE INVENTION

According to the present invention, there is provided a fiber having a surface comprising molybdenum carbide having a face-centered-cubic crystal structure, which fiber is stable at temperatures below about 800°C. Such a fiber can be produced by subjecting a fiber having a surface comprising dimolybdenum monocarbide to a pulse of electric voltage sufficient to raise momentarily the temperature of the fiber surface to a temperature ranging from about 2,000°C. to about 2,500°C. This fiber can have a carbon core, which does not interfere with its use as a superconductor fiber; or the fiber can be entirely converted to $\alpha$-MoC.

More generically, the present invention provides a fiber having a surface consisting essentially of a superconductor carbide and a core selected from the group consisting of carbon and superconductive carbide. The superconductive carbide being the reaction product of a chemical reaction of a precursor carbon fiber. Such a fiber can be made by (1) heating a fiber having a surface consisting essentially of dimolybdenum monocarbide and a core of carbon to a temperature of from about 2,000°C to about 2,500°C, and (2) rapidly cooling said fiber to a temperature below about 100°C.

BRIEF DESCRIPTION OF THE DRAWINGS

FIG. 1 is a schematic representation of a cross section of a carbon fiber from which the fiber of the present invention is made.

FIG. 2 is a schematic representation of a reaction furnace, in which the carbon fiber as illustrated in FIG. 1 can be transformed into a carbon fiber having a surface of dimolybdenum monocarbide.

FIG. 3 is a schematic illustration of a cross section of a fiber having a surface of dimolybdenum monocarbide.

FIG. 4 is a schematic representation of one type of apparatus which can be utilized to transform the fiber of FIG. 3 into a fiber of the invention.

FIG. 5 is a schematic representation of a cross section of one embodiment of the present invention, namely a fiber having a carbon core and a surface comprising $\alpha$-MoC, having a face-centered-cubic crystal structure.

DETAILED DESCRIPTION

Figure 7:
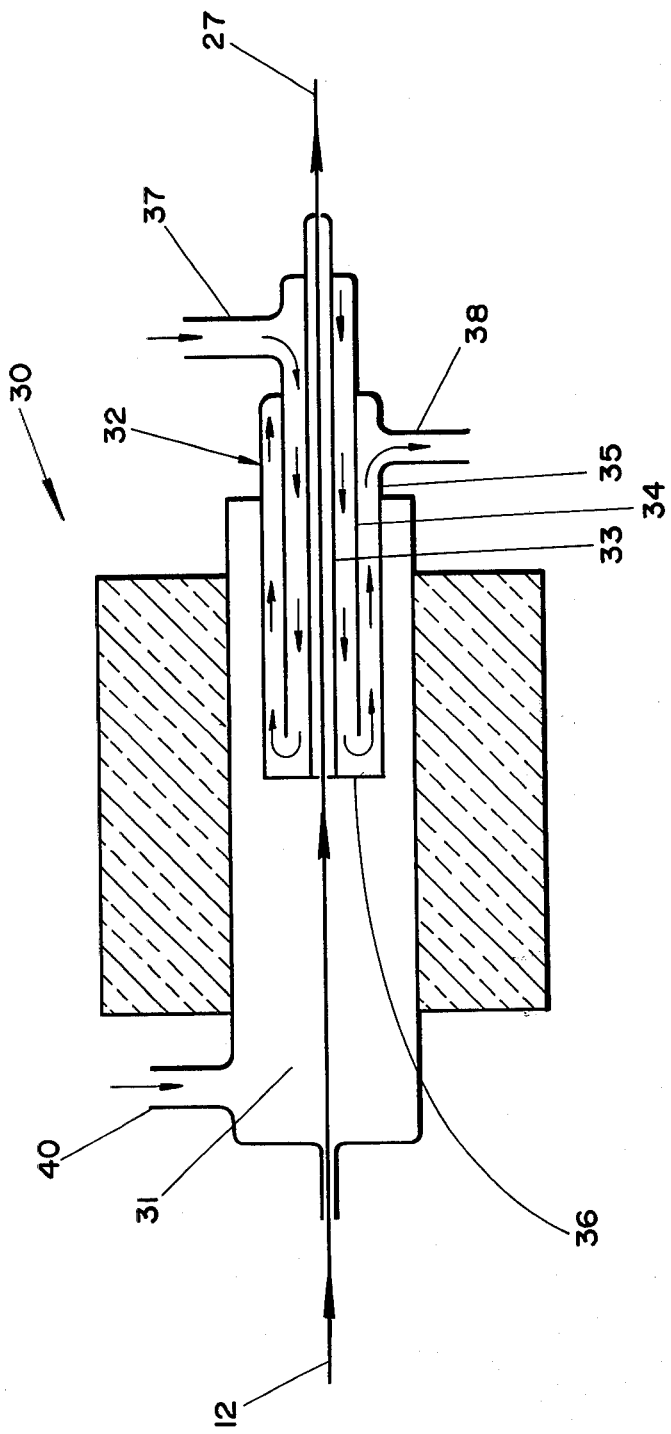
FIG. 7 is a schematic representation of a second type of apparatus which can be utilized to transform the fiber of FIG. 3 into a fiber of the invention.

Referring now to the drawings, the starting material for the process of the present invention is carbon fiber, as illustrated in FIG. 1. The cross section of this fiber is essentially pure carbon 10. This fiber is passed through a reaction furnace 11 (see FIG. 2) comprising an atmosphere of hydrogen and molybdenum pentachloride, maintained at a temperature of from about 1,200° to about 1,850°C. The $H_2$ and $MoCl_5$ react to form free molybdenum according to the following formula:

$$2MoCl_5 + 5H_2 \rightarrow 2Mo + 10HCl$$

The free molybdenum then reacts with the carbon fiber to form a surface of dimolybdenum monocarbide, leaving, however, a carbon core:

$$2Mo + C \rightarrow Mo_2C$$

It is important to retain a carbon core for the next step, i.e., conversion of the $Mo_2C$ to $\alpha$-MoC by passing electrical current through the fiber.

The residence time for the fiber within the reaction furnace should range from about 3 to about 20 minutes. Longer times (e.g., 10–20 minutes) and higher temperatures (e.g., 1,500–1,850°C) are preferred if it is desired to produce a fully converted $\alpha$-MoC fiber (i.e., without a carbon core), in order to allow solid state diffusion to occur. To produce only thin surfaces of $\alpha$-MoC, with a carbon core remaining, this extra residence time is unnecessary, since the carbon core provides excess carbon for the later conversion of $Mo_2C$ to $\alpha$-MoC. If a fully converted fiber is desired and a longer time and higher temperature are used, the $MoCl_5$ content of the reaction furnace should be controlled to prevent excessive conversion of the carbon to $Mo_2C$.

The proper amount of MoCl₅ is easily determined empirically. After passing through the furnace, carbon fiber 10 reappears as fiber 12 having a surface comprising dimolybdenum monocarbide. This fiber is illustrated in cross section in FIG. 3, wherein the carbon core 13 is surrounded by a surface of dimolybdenum monocarbide 14.

Fiber 12 having a surface comprising dimolybdenum monocarbide is next passed through either the apparatus of FIG. 4 or the apparatus of FIG. 7. The apparatus of FIG. 4 comprises a reaction chamber 15 which is conveniently constructed of glass. Reaction chamber 15 is provided with fiber inlet 16 and fiber outlet 17, both of which are constructed so as to allow the passage of Fiber 12, but otherwise being as small as possible to prevent the entry of unwanted oxidizing gases (i.e., atmospheric oxygen) into reaction chamber 15. In order to maintain an inert atmosphere within reaction chamber 15, an inert gas such as argon, nitrogen, helium or hydrogen is fed into reaction chamber 15 through inert gas inlet 18. In order to prevent the entry of oxygen, a slight positive gauge pressure is maintained within apparatus 15.

Reaction chamber 15 is further provided with a pair of fiber guides 19 and 20, in order to accurately and properly position fiber 12 within the reaction chamber 15. Between fiber guides 19 and 20, there is provided a pair of standpipe electrodes 21 and 22, each of which is filled with an electrically conductive liquid, such as mercury or liquid gallium. The electrically conductive liquid forms a bubble at the top of each electrode, through which fiber 12 is led. Electrodes 21 and 22 are provided with leads 23, 24, respectively, to power supply 25, pulse timer 26 and power input 26A.

Fiber 12 is fed into reaction chamber 15 and through fiber guide 19 in such a manner that successive portions of the fiber 12 are contacted between electrodes 21 and 22. A very short pulse voltage is applied between electrodes 21 and 22, for example from about 10 to about 100 volts per centimeter of distance between electrodes 21 and 22, more particularly from about 30 to 40 volts per centimeter; and for a time ranging, for example, from about 0.01 to about 0.5 seconds, more particularly from about 0.05 to about 0.1 seconds, per pulse. If desired, more than one pulse of voltage can be applied to the fiber in one location, but in general it is preferred to apply only one pulse to the fiber before moving the fiber on to a new location, so that a new portion of the fiber is subjected to the voltage. The above times and voltages are only exemplary, since the magnitude of the voltage, and time of pulse of voltage, are adjusted to obtain the proper temperature of the fiber momentarily, which is between about 2,000° and 2,500°C. This is because the desired α-MoC phase is most thermodynamically stable between about 1,960°C and about 2,584°C. Whether the proper temperature has been reached can be determined by the critical temperature of the fiber surface, and by X-ray diffraction.

After being subjected to this voltage, fiber 12 with a surface comprising dimolybdenum monocarbide is transformed to fiber 27, which has a surface comprising molybdenum carbide having a face-centered-cubic crystal structure. This fiber 27 is then fed through fiber guide 20 and fiber outlet 17, into the external world. Fiber 27 can have the cross section illustrated in FIG. 5, namely, having a carbon core 13 and a surface comprising α-MoC, 28. Alternatively fiber 27 can have the cross section illustrated in FIG. 6, wherein the reacted fiber 29 is entirely converted to α-MoC. Although this phase is referred to herein as "α-MoC" for convenience, the actual formula is more properly represented as α-MoC$_{1-x}$, since the molybdenum and carbon are not necessarily present in the crystal lattice in exactly equal amounts. The value of $x$ in the formula "α-MoC$_{1-}$" is a fraction, up to as much as 0.33, whose exact value depends on a number of variables including the maximum temperature attained by the fiber.

There are, of course, many variations on the above apparatus possible. For example, instead of using standpipe electrodes 21 and 22, it is possible to provide curvatures within fiber inlet 16 and fiber outlet 17, so that a mercury or other liquid electrode material can be contained within the inlet and outlet serving both functions of electrical contact and insulating the fiber from the oxidizing atmosphere much better than a mere open hole. Likewise, the apparatus could be arranged vertically, with the fiber passing successively through two pools of mercury or other liquid electrode material, with the flow of mercury being prevented by the size of the capillary through which the fiber passes. The use of a vertical configuration would likewise control the entrance of oxidizing atmospheres into the reaction chamber better than an open hole through which the fiber is passed. With this better control of entrance of oxidizing gases, it would not be necessary to provide a positive pressure of inert gas within reaction chamber 15.

Figure 6:
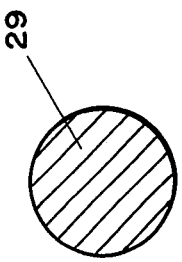
FIG. 6 is a schematic representation of a second embodiment of the present invention, namely a fiber which is entirely converted to $\alpha$-MoC.

Another form of apparatus to transform the fiber of FIG. 3 (having a carbon core and a surface of Mo₂C) to the fiber of FIG. 5 (having a surface comprising α-MoC and a core of carbon) or of FIG. 6 (which is entirely converted to α-MoC) is illustrated in FIG. 7. Fiber 12 having a surface comprising dimolybdenum monocarbide enters tube furnace 30 which contains an inner chamber 31 which is maintained at a temperature at which the α-MoC phase is thermodynamically stable, between about 2,000°C and 2,500°C. Quench chamber 32 comprises 3 concentric stainless steel tubes 33–35, sealed at end 36 so as to allow passage of fiber 12 through the innermost tube, but so as to prevent escape of coolant. Coolant liquid, preferably water, enters quench chamber 32 at coolant inlet 37, travels between concentric tubes 33 and 34 to end 36, and then between concentric tubes 34 and 35 to coolant outlet 38. The space within tube 33 is thus maintained at a much cooler temperature than the balance of the tube furnace inner chamber 31, perhaps 25°C. As fiber 12 enters quench chamber 32 it is thus rapidly quenched, so that the α-MoC phase is maintained in fiber 27 which emerges from quench chamber 32. Oxidation of the fiber is prevented by maintaining an inert atmosphere (preferably argon) in the inner chamber 31 of tube furnace 30. This atmosphere is conveniently maintained by providing a slight positive gauge pressure within inner chamber 31, but feeding argon into inner chamber 31 through inert gas inlet 40.

The invention will now be illustrated with examples.

EXAMPLE 1

Carbon yarn comprising 720 filaments per yarn, each filament being about 10 microns in diameter, was passed through a reaction furnace containing an atmosphere of hydrogen and molybdenum pentachloride, maintained at a temperature of from about 1,200° to 1,500°C, for a time of from about 3 to 15 minutes. The resulting fiber had a surface of dimolybdenum monocarbide. This fiber was then passed through an apparatus such as illustrated in FIG. 4, comprising two standpipe electrodes positioned approximately 10 cm apart. Various portions of molybdenum carbide surface yarn were subjected to voltages as set out in Table 1. All voltages stated herein are measured under no-load conditions.

Table 1

| Sample | Voltage | No. of Pulses |
|---|---|---|
| 1 | 309 | 1 |
| 2 | 335 | 1 |
| 3 | 360 | 1 |
| 4 | 386 | 1 |
| 5 | 412 | 1 |
| 6 | 309 | 3 |
| 7 | 309 | 20 |
| 8 | 335 | 7 |
| 9 | 335 | 10 |
| 10 | 360 | 5 |

All voltages were direct current; and the duration of all pulses was 0.05 seconds for this example. These voltages produced temperatures on the surface of the fiber of between about 2,000°C and about 2,500°C. The yard which had been subjected to these voltages was examined by X-ray diffraction, and in each case the surface of the individual filaments was found to be $\alpha$-MoC, having a face-centered-cubic crystalline structure.

The stability of the $\alpha$-MoC surface of the fibers made according to the above example was tested by subjecting samples of the fibers to 30 minutes duration of various temperatures as set out in Table 2. After the fibers had been subjected to this treatment, they were again examined by X-ray diffraction, and their major phases, lattice constants, and number of lines indicative of dimolybdenum monocarbide were observed. The results are set out in Table 2.

Table 2

| Temperature | Major Phase | Lattice Constant | Number of $Mo_2C$ Lines Observed |
|---|---|---|---|
| 400°C | $\alpha$-MoC | 4.256 | 1 |
| 600°C | $\alpha$-MoC | 4.256 | 1 |
| 800°C | $\alpha$-MoC | 4.248 | 2 |
| 850°C | $\alpha$-MoC | 4.237 | 5 |
| 900°C | $Mo_2C$ | — | 22 |
| CONTROL | $\alpha$-MoC | 4.256 | 1 |

It can be seen from the above that the fibers produced were stable at least at temperatures below about 800°C.

By examination of the X-ray diffraction results of samples Nos. 6–10, it was observed that the larger number of pulses utilized in producing the $\alpha$-MoC outer surface produced layer crystallites of $\alpha$-MoC material, as well as weaker fibers. It is therefore preferred to utilize a single pulse, or at best two pulses for conversion of the dimolybdenum monocarbide to $\alpha$-MoC. Even within this framework, however, it is possible to produce fibers having a surface consisting essentially of $\alpha$-MoC and carbon in a continuous fashion, by passing the fiber through reaction furnace 11 in a continuous fashion, followed by passing the dimolybdenum monocarbide surfaced fiber through the reaction cahmber 15 in a continuous fashion. The pulse timer 26 and the speed of passage of fiber 12 through chamber 15 are coordinated to achieve the desired result of subjecting the fiber 12 to one or at most two pulses of voltage. Thus, fiber 12 could be arranged to travel at a speed of 8 cm every 5 seconds with pulse timer 26 delivering a pulse of voltage every 5 seconds. Each pulse would then subject 8 cm of fiber to voltage for a first time, and 2 cm of fiber for a second time. This small amount of overlap is desirable to prevent untreated portions of fiber from occurring.

The word "surface" as used herein is not intended to imply only the outermost area of the fiber, but extends a substantial depth into the fiber. Fibers having a surface with a thickness ranging from less than 1 micron to about 5 microns or more can be produced in accordance with the present invention. Thus, as used therein, a fiber having a surface of a material can, be either partially or totally the material of the surface. Indeed, using finer carbon fibers and properly controlled reaction conditions in making the fiber 12 having a dimolybdenum monocarbide surface and carbon core, it is quite possible, as illustrated in the following Example 2, to produce entirely converted fibers.

EXAMPLE 2

A carbon yarn composed of 720 filaments of 6 micron diameter is continuously passed through a reaction furnace 11 as illustrated in FIG. 2, maintained at 1,800°–1,850°C, the fiber having a 15 minute residence time at this temperature. The $MoCl_5$ in the reaction furnace is provided by heating solid $MoCl_5$ to about 200°C and passing a carrier gas of 200 cc/minute of argon over the surface of the liquid $MoCl_5$. Hydrogen at 35 cc/minute, and additional argon at 600 cc/minute, are also added to the reaction furnace 11. The $MoCl_5$ present in reaction furnace 11 is controlled so that the reacted fiber 12 has a content of about 3 moles of $Mo_2C$ for each mole of uncombined carbon.

The fiber shows a weight gain of about 1,200%, indicating about 3 moles of $Mo_2C$ for each mole of unreacted carbon. An X-ray diffraction pattern shows the fiber is mainly $Mo_2C$, with uncombined carbon also present.

Fiber 12 is then passed through tube furnace 30 (see FIG. 7), the hot zone within inner chamber 31 being maintained at 2,200°C. The hot zone (excluding quench chamber 32) has a length of about 12 inches and the yarn passes through at about 3 inches per second, allowing a 4 second residence time to achieve the 2,200°C temperature. During this time the yarn converts to $\alpha$-MoC. The yarn enters quench chamber 32 rapidly, which is maintained at about 30°C, thereby rapidly cooling the fiber to a temperature below about 100°C. Upon leaving quench chamber 32, fiber 27 is found by X-ray diffraction to be $\alpha$-MoC, with no other detectible phase.

The electrical conversion method shown in FIG. 4 can also be used for converting the $Mo_2C$ phase to $\alpha$-MoC.

We claim:
1. A fiber having a surface consisting essentially of high critical field molybdenum carbide having a face-centered-cubic crystal structure, which fiber is stable at temperatures below 800°C.
2. A fiber according to claim 1, having a carbon core.

3. A fiber according to claim 1, which is entirely α-MoC.

4. A fiber having a surface consisting essentially of superconductive α-MoC and a core selected from the group consisting of carbon and superconductive α-MoC, the superconductive α-MoC being the reaction product of a chemical reaction of a precursor carbon fiber.

5. A process for producing a fiber according to claim 1, comprising subjecting a fiber having a surface consisting essentially of dimolybdenum monocarbide and a core or carbon, to a pulse of electric voltage sufficient to raise momentarily the temperature of the fiber surface to a temperature ranging from about 2,000°C to about 2,500°C.

6. A process according to claim 5, wherein the voltage applied ranges from about 10 to about 100 volts per cm.

7. A process according to claim 6, wherein the voltage is applied for a time ranging from about 0.01 to about 0.5 seconds per pulse.

8. A process according to claim 5, wherein the voltage applied to the fiber ranges from about 30 to about 40 volts per cm.

9. A process according to claim 8, wherein the voltage is applied for a time ranging from about 0.05 to about 0.1 seconds per pulse.

10. A process according to claim 7, wherein the fiber with a surface of dimolybdenum monocarbide is formed by reacting a carbon fiber with hydrogen and molybdenum pentachloride.

11. A process according to claim 10, wherein the fiber having a surface of dimolybdenum monocarbide is formed by passing a carbon fiber through a furnace having an atmosphere of molybdenum pentachloride and hydrogen, and a temperature ranging from about 1,200° to about 1,850°C, for a time ranging from about 3 to about 20 minutes.

12. A process for producing a fiber according to claim 1, comprising (1) heating a fiber having a surface consisting essentially of dimolybdenum monocarbide and a core of carbon to a temperature of from about 2,000°C to about 2,500°C, and (2) rapidly cooling said fiber to a temperature below about 100°C.

* * * * *